(12) United States Patent
Kapner, III et al.

(10) Patent No.: US 7,577,973 B1
(45) Date of Patent: Aug. 18, 2009

(54) CLIENT TERMINAL FOR DISPLAYING PROGRAM GUIDE INFORMATION ASSOCIATED WITH DIFFERENT PROGRAMS WITHIN A POP-UP

(75) Inventors: L. Jeffrey Kapner, III, Yorba Linda, CA (US); Timothy J. Elliott, Fullerton, CA (US); Peter Jay Schwartz, Fullerton, CA (US)

(73) Assignee: Keen Personal Media, Inc., Lake Forest, CA (US)

( * ) Notice: Subject to any disclaimer, the term of this patent is extended or adjusted under 35 U.S.C. 154(b) by 898 days.

(21) Appl. No.: 09/872,197

(22) Filed: May 31, 2001

(51) Int. Cl.
*G06F 3/00* (2006.01)
*G06F 13/00* (2006.01)
*H04N 5/445* (2006.01)

(52) U.S. Cl. .............. 725/44; 725/39; 725/46; 725/47; 725/52; 715/716

(58) Field of Classification Search .............. 725/37, 725/39, 44, 46, 47, 52; 715/716, 719
See application file for complete search history.

(56) References Cited

U.S. PATENT DOCUMENTS

| | | | | |
|---|---|---|---|---|
| 5,867,226 A * | 2/1999 | Wehmeyer et al. | ............. | 725/46 |
| 6,020,930 A * | 2/2000 | Legrand | ....................... | 725/41 |
| 6,177,931 B1 * | 1/2001 | Alexander et al. | ............. | 725/52 |
| 6,453,471 B1 * | 9/2002 | Klosterman | ................... | 725/41 |
| 6,463,586 B1 * | 10/2002 | Jerding | ........................ | 725/37 |
| 6,505,348 B1 * | 1/2003 | Knowles et al. | ............... | 725/49 |
| 6,522,342 B1 * | 2/2003 | Gagnon et al. | .............. | 715/716 |
| 6,564,379 B1 * | 5/2003 | Knudson et al. | .............. | 725/42 |
| 2002/0124255 A1 * | 9/2002 | Reichardt et al. | ............. | 725/42 |

\* cited by examiner

*Primary Examiner*—Joseph G Ustaris
(74) *Attorney, Agent, or Firm*—Blakely, Sokoloff, Taylor & Zafman

(57) ABSTRACT

A client terminal providing an on-screen program guide that allows a user to easily navigate through program guide information within a pop-up for different programs on a selected channel. A head end provides program guide information (PGI) to the client terminal. The PGI includes first program data (FPD) associated with a first program and second program data (SPD) associated with a second program. The client terminal includes a terminal controller responsive to an on-screen display control program that causes: the display of channel identifiers, the selection of one of the channel identifiers in response to a first input, and the display of a pop-up for the selected channel identifier. The pop-up displays the FPD associated with the first program in response to the first input. In response to a second input, the pop-up displays the SPD associated with the second program.

21 Claims, 3 Drawing Sheets

CLIENT TERMINAL FOR DISPLAYING PROGRAM GUIDE INFORMATION ASSOCIATED WITH DIFFERENT PROGRAMS WITHIN A POP-UP

BACKGROUND OF THE INVENTION

1. Field of the Invention

The present invention relates to the field of program guides for the presentation of channel and program information. More particularly, the present invention relates to a client terminal for displaying program guide information associated with different programs within a pop-up.

2. Description of the Prior Art

Television signals are broadcasted on the airwaves, through cables, and via satellite. The number of stations accessible today has increased to hundreds of stations. To select a program to view, many viewers simply "channel surf" until they find a channel that has a desirable program, which is a tedious and laborious process. Channel surfing refers to the process of using the channel "+" or "−" key of a remote control to sequentially view each channel. Although some viewers find channel surfing among hundreds of stations enjoyable, most viewers prefer a more direct method for selecting a program to view.

Accordingly, on-screen program guides have been devised that display a listing of the channels, typically in numerical order, and the titles of the programs being broadcasted or to be broadcasted on the channels. These existing on-screen program guides typically show the user the list of channels and corresponding programs in a fixed grid format that scrolls (automatically or manually) in a vertical direction across the screen for a fixed interval of time displayed in a horizontal direction across the screen. The user of the on-screen program guide may then select the channel by entering in the channel number or selecting a program. The system responds by removing the on-screen program guide being displayed and tuning to the station selected and displaying the program.

Some existing fixed grid format on-screen program guides, as previously described, further allow the user to select a channel and program to display additional program guide information regarding the selected program. After viewing this additional program guide information, the user can select the program for viewing or return to the grid-based on-screen program guide. Unfortunately, these existing on-screen program guides do not allow a user to easily navigate through program guide information for other programs showing at different times on the selected channel.

There is, therefore, a need to provide techniques for allowing a user to easily navigate through program guide information for different programs showing at different times on a selected channel.

SUMMARY OF THE INVENTION

The present invention may be regarded as a client terminal, program, and method for providing an on-screen program guide that allows a user to easily navigate through program guide information within a pop-up for different programs showing at different times on a selected channel. The client terminal is connectable to a head end and a display device. The head end provides program guide information to the client terminal. The program guide information includes first program data associated with a first program and second program data associated with a second program.

The client terminal comprises a channel input interface to receive the program guide information, a user interface to receive a first input and a second input, and a terminal controller responsive to an on-screen display (OSD) control program. The terminal controller responsive to the OSD control program causes: the display of channel identifiers on the display device, the selection of one of the channel identifiers in response to the first input, and the display of a pop-up for the selected channel identifier on the display device.

The pop-up displays the first program data associated with the first program in response to the first input. Furthermore, the user interface is capable of receiving a second input while the pop-up is displaying the first program data to access program guide information related to another, or second, program. In response to the second input, the pop-up displays the second program data associated with the second program (occurring at a different time). In this way, a user can easily navigate through program guide information within a pop-up for different programs showing at different times on a selected channel.

DESCRIPTION OF THE PREFERRED EMBODIMENTS

Figure 1:
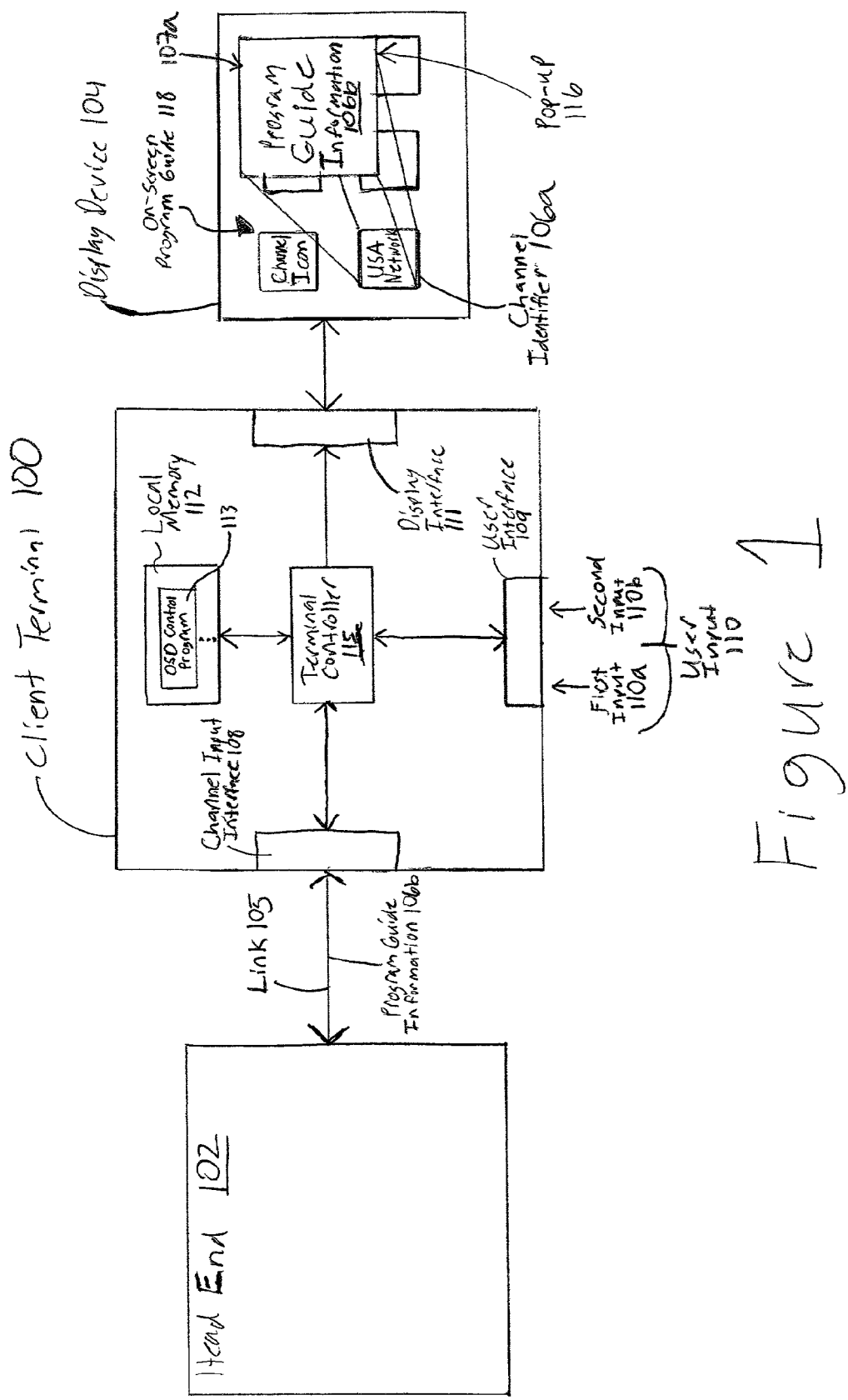
FIG. 1 shows a client terminal according to an embodiment of the present invention connected to a head end and a display device for displaying program guide information in a pop-up.

FIG. 1 shows a client terminal 100 connected to a head end 102 and a display device 104 for displaying program guide information within a pop-up 116 in order to allow a user to easily navigate through the program guide information, according to an embodiment of the present invention. The head end 100 provides program guide information 106b to the client terminal 100 through a link 105, as well as video programs. The program guide information includes first program data associated with a first program and second program data associated with a second program. The head end 102 can be a cable head end, a satellite head end, a terrestrial broadcast head end, or a computer server head end capable of broadcasting the program guide information 106b and the video programs. The display device 104 is typically a television, computer monitor, or any other sort of display device.

The program guide information 106b can be transmitted in any type of data format designed to transfer data such as concatenated data, packetized data, associated database sets of attributes, etc. The video programs can be transmitted in a digital format (e.g. Moving Pictures Experts Group (MPEG)-2 format, Advanced Television System Committee (ATSC) format, Digital Video Broadcast (DVB) format, etc.) or analog format (e.g. National Television Standard Committee (NTSC)) across the link 105 to the client terminal 100. The video programs typically include audio and video (A/V) information (e.g. a movie, television program, etc.) but can also include other types of information such as data. For example, the data of a digitally broadcasted video program may include graphics, video, web pages, multimedia, text, and other types of data in a variety of differing data formats (e.g. Internet Protocol (IP), Advanced Television Enhancement Forum (ATVEF) content, Open Cable Standards, etc.).

The link 105 can be broadly defined as a communication network formed by one or more transport mediums. The link 105 can include a variety of communication networks such cable networks, terrestrial broadcast networks, satellite networks, computer networks (e.g. wide area networks (WANs), the Internet, local area networks (LANs), etc), or generally any sort of public or private communications network, and combinations thereof Examples of a transport medium include, but are not restricted to electrical wire, optical fiber, cable, or wireless channels using terrestrial, satellite, radio frequency, or any other wireless signaling methodology.

The client terminal 100 of FIG. 1 includes a channel input interface 108, a user interface 109, a display interface 111, a local memory 112, and a terminal controller 115. The channel input interface 108 is used to receive the program guide information 106*b* and the video programs from the head end 102. The user interface 109 is used to receive user input 110. User input 110 includes a first input 110*a* to select a channel identifier 106*a* resulting in the display of a pop-up 116 having first program data associated with a first program currently being displayed on the channel and a second input 110*b* to display second program data associated with a second program, occurring before or after the currently playing first program, also within the pop-up 116, as will be discussed in more detail later. The user input 110 can also cause the client terminal 100 to perform other functionality associated with client terminals (e.g. changing channels). The user input 110 can be from a remote control (e.g. infrared or optical), mouse, touch screen, voice activation, keyboard, or basically any sort of input device to transmit the selections of the user to client terminal 100.

The display interface 111 displays an on-screen program guide 118 including channel identifiers 106*a*, program guide information 106*b*, and the pop-up 116, on the display device 104. Also, the display interface displays video programs transmitted from the head end 102 on the display device 104. Each channel identifier 106*a* occupies a cell of the on-screen program guide 118. The channel identifier 106*a* represents a channel. The channel identifier 106*a* can be a channel icon, channel logo, or some other unique channel identifier to designate a video program provider (e.g. a broadcast television network or cable network) associated with the channel.

In one embodiment, the local memory 112 is used to store an on-screen display (OSD) control program 113. Also, the local memory 112 can be used to store the channel identifiers 106*a*, program guide information 106*b*, video programs, and other types of information. In one embodiment, the local memory 112 includes a rotating storage disk (e.g. magnetic, optical, etc.). Alternatively, the OSD control program 113 can be located at the head end 102 or another remote location. In that embodiment, the head end 102, or other remote location, generates the on-screen program guide 118, including the channel identifiers 106*a* and the program guide information 106*b*, and transmits the on-screen program guide 118 to the client terminal 100.

The terminal controller 115 is responsive to the OSD control program 113 to perform many of the functions of the client terminal 100, as will be discussed. As should be appreciated by those skilled in the art, the terminal controller 115 generally includes a suitable processor and associated memory. Moreover, it should be appreciated that client terminals with recording capabilites and other types of set top boxes are well known in the art.

In one embodiment, the OSD control program 113 is generally implemented by the terminal controller 115 of the client terminal 100 as one or more instructions or code segments. The instructions/code segments which when read and executed by the terminal controller 115, cause the terminal controller 115 to perform the operations necessary to implement the various functions according to embodiments of the invention. Generally, the instructions/code segments are tangibly embodied in and/or readable from a machine-readable medium, device, or carrier, such as memory, data storage devices, and/or a remote device contained within or coupled to the client terminal 100. The instructions/code segments may be loaded from memory (e.g. local memory 112), data storage devices, and/or remote devices into the terminal controller 115 for use during operations.

The terminal controller 115 responsive to the OSD control program 113 causes the display of the channel identifiers 106*a* on the display device 104. In response to a first input 110*a* from a user, the terminal controller 115 responsive to the OSD control program 113, selects one of the channel identifiers 106*a* and causes the display of a pop-up 116 for the selected channel identifier 106*a* on the display device 104. For example, as shown in FIG. 1, the channel identifier 106*a* with the unique channel identifier "USA NETWORK" has been selected by the first input 110*a* causing the display of pop-up 116 which includes first program data 107*a* associated with the first program currently being displayed on the selected channel. Furthermore, the user interface 118 is capable of receiving a second input 110*b* from the user, while the pop-up is displaying the first program data 107*a*, allowing the user to access program guide information related to another, or second, program. In response to the second input 110*b*, the pop-up 116 displays second program data associated with a second program occurring at a different time, as will be discussed in more detail later. In this way, a user can easily navigate through program guide information within a pop-up for different programs showing at different times on a selected channel.

Figure 2:
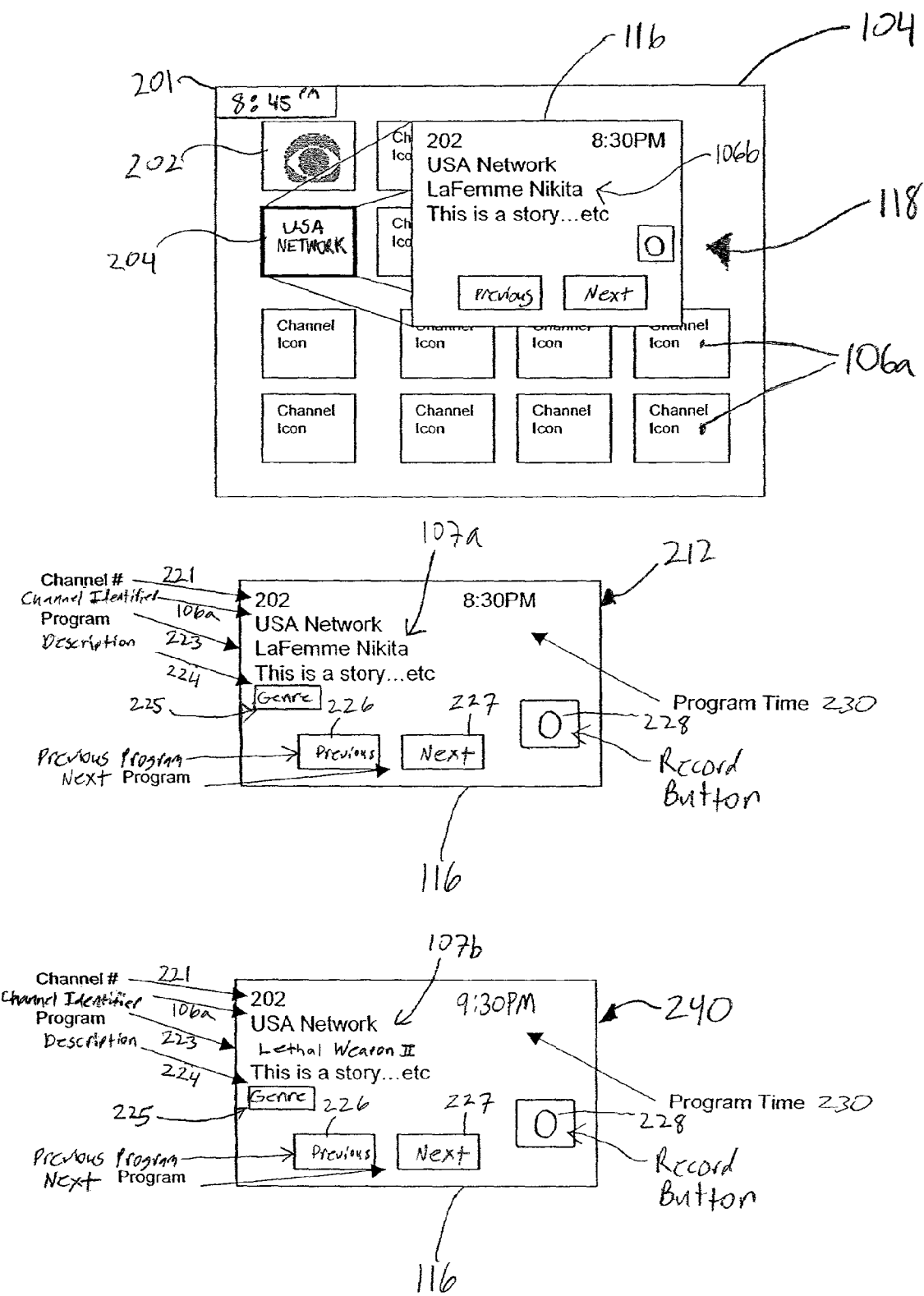
FIG. 2 illustrates an example of an on-screen program guide generated by the client terminal, according to the embodiment of the invention shown in FIG. 1, and more specifically, illustrates the display of program guide information associated with different programs within a pop-up.

FIG. 2 illustrates an example of the on-screen program guide 118 generated by the client terminal 100, according to the embodiment of the invention shown in FIG. 1, and more specifically, illustrates the display of program guide information 106*b* associated with different programs within a pop-up 116. Typically, a user will transmit user input 110, via a user input device, to the client terminal 100 to request the display of the on-screen program guide 118. In response, the on-screen program guide 118 as shown in FIG. 2 will appear on the display device 104, in which, each channel identifier 106*a* occupies a square-shaped cell. The channel identifiers 106*a* are arranged in rows and columns, respectively. Although the on-screen program guide 118 is shown in FIG. 2 with a four row by four column display of channel identifiers 106*a*, it should be appreciated that any number of channel identifiers 106*a* could be displayed. A time designator 201 showing the current time can be located in the upper left hand corner, but alternatively could be located anywhere. Additionally, the on-screen program guide 118 can also be used to display advertisements.

Each channel identifier 106*a* can be a channel icon, channel logo, or some other unique channel identifier to designate a video program provider (e.g. a broadcast television network or cable network) associated with the channel. For example, as shown at cell 202, the channel logo for CBS is shown. Alternatively a unique channel identifier, such as the name of the video program provider associated with the channel can be used. For example, as shown at cell 204, the text USA NETWORK is used to denote the channel USA NETWORK. The channel identifiers 106*a* can be any sort of graphic, text, video, multimedia, etc. to denote a channel. For example, the channel identifier 106*a* can be any sort of accepted graphic format such as JPEG, GIF, TIF, video MPEG, etc. Although examples of broadcast television channels have been given, it should be appreciated that the channel identifiers 106a can represent cable channels, satellite channels, music channels, messaging channels, email channels, or even Internet Favorites. For example, in a computing/Internet environment each channel 106a could represent a favorite Web Page.

The on-screen program guide 118 can display the channel identifiers 106a in a variety of different ways. For example, the on-screen program guide 118 can display the channel identifiers 106a in increasing numerical order of the channel numbers, alphabetically by the name of the channels, or in a myriad of other fashions. Additionally, the on-screen program guide 118 can group the channel identifiers 106a by genre such as: sports channels, pay-per view channels, educational channels, news channels, etc., as programmed by the user. In another example, the user could program his or her favorite channels in a predetermined order such the when the on-screen program guide 118 appears it displays the predetermined channel identifiers for the user's programmed favorite channels in the predetermined order set by the user.

As previously discussed, the terminal controller 115 responsive to the OSD control program 113 causes the display of the channel identifiers 106a on the display device 104, which can be navigated through by a user. The user can navigate through channel identifiers 106a by the use of a user input device, which delivers user input 110 to the user interface 109 of the client terminal 100. For example, a remote control with directional indicators, such as a compass like 4 or 5 key yoke, can be used to deliver first inputs 110a to the client terminal 100. With the remote control, the user can move to each unique cell having a channel identifier 106a. As the user moves to each channel identifier, via first inputs 110a to select each channel identifier 106a, the terminal controller 115 responsive to the OSD control program 113 causes the display of a pop-up 116 for the selected channel identifier 106a to appear filling a portion of the screen. If the user moves past an end channel identifier 106a in a given row or column, then a new display of channel identifiers 106a for subsequent or previous channels, respectively, will be displayed. As shown in FIG. 2, the channel identifier 204 with the unique channel identifier "USA NETWORK" has been selected by a first input 110a causing the display of pop-up 116. The pop-up 116 includes first program data 107a associated with the video program currently being displayed on the USA NETWORK.

As shown in example 212 of the pop-up 116, which displays the first program data 107a for the selected USA NETWORK channel, the pop-up 116 includes a unique channel number indicator 221 that is representative of the video program provider's (in this case the USA NETWORK) location on the current system being used. The pop-up 116 also includes the channel identifier 106a, as previously discussed. In this case, the channel identifier 106a is the text USA NETWORK. The pop-up 116 further includes the title of the program 223 (e.g. LaFemme Nikita) that is playing during the corresponding time that user is watching (i.e., if the user is watching at 8:45PM then the corresponding information for the program that is airing between 8:30PM and 9:00PM will be displayed). Also, a program time 230 (e.g. 8:30PM), corresponding to the start of the program is shown. Additionally, a description of the program 224 can also be displayed within the pop-up 116. The program description 224 can include a brief program story-line description, as well as, the actors, actresses, and writer associated with the program, the duration of the program, etc. In fact, any information relevant to the program can be included in the program description 224. The pop-up 116 can also display the genre 225 (e.g. sports, educational, action, drama, news, etc.) of the program currently being aired. Further, the pop-up can include a record icon, such as a record button 228, that can be selected such that the designated program will be recorded by the client terminal 100 into local memory 112 either at the time of selection (if the program is currently airing) or at a future time at which the program is to air.

The pop-up 116 also includes a previous icon 226 and a next icon 227. For example, the next and previous icon can be selectable buttons with the text "Next" and "Previous", respectively, or can include the program titles of the programs immediately following or immediately preceding the program currently being displayed in the pop-up 116, respectively. It should be appreciated that any type of icon for denoting next and previous programs can be used. As previously discussed, the user interface 109 of the client terminal 100 is capable of receiving a second input 110b (e.g. from a user input device) while the pop-up 116 is displaying the first program data 107a, as shown in example 212 of the pop-up, to access program guide information related to another, or second, program. In response to the second input 110b, the pop-up 116 displays second program data 107b, as shown in example 240 of the pop-up 116, associated with a second program occurring at a different time. For example, the second input 110b can be used to select the next icon 227 which results in the display of second program data 107b that is associated with a second program that occurs after the first program. Alternatively, the second input 110b can be used to select the previous icon 226 which results in the display of second program data that is associated with a second program that occurs before the first program.

As an example, the user interface 109 of the client terminal 100 is capable of receiving a second input 110b while the pop-up 116 is displaying the first program data 107a (e.g. for LaFemme Nikita) as shown in example 212 of the pop-up. In response to the second input 110b, the pop-up 116 displays second program data 107b, as shown in example 240 of the pop-up 116, associated with the second program, e.g. Lethal Weapon II (program title 223) occurring at a different time, e.g. 9:30PM (program time 230). In this way, a user can easily navigate through program guide information within the pop-up 116 for different programs showing at different times on a selected channel, e.g. channel number 202 for the USA NETWORK. Thus, using the next and previous icons 226 and 227, the user can conveniently cycle through the program information for the various programs being aired on a channel with the pop-up 116.

Figure 3:
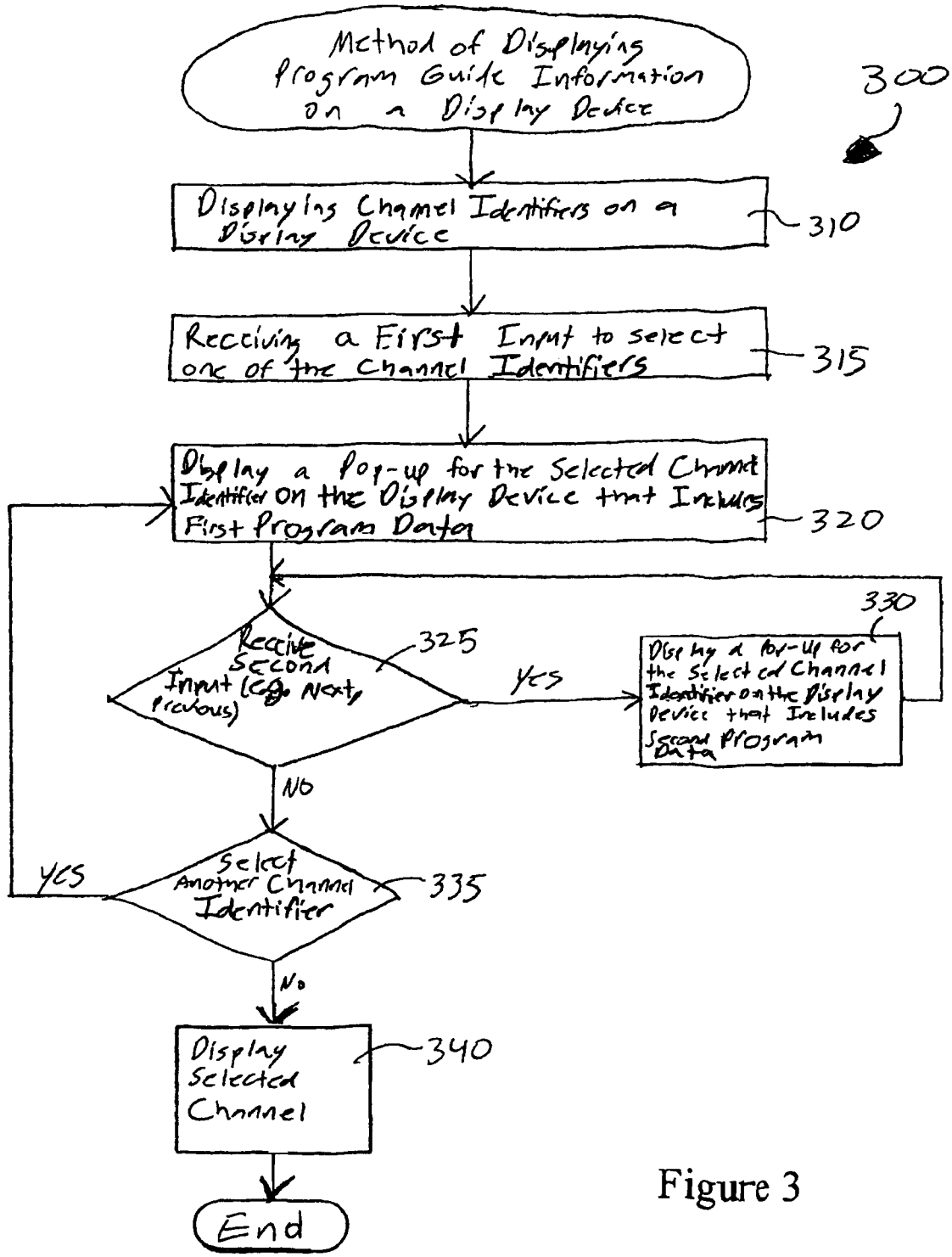
FIG. 3 is a flow diagram according to the embodiment of the invention shown in FIG. 1.

FIG. 3 is a flow diagram 300 according to the embodiment of the invention shown in FIG. 1. The flow diagram 300 illustrates a method of displaying program guide information 106b on a display device 104. At step 310, the terminal controller 115 responsive to the OSD control program 113 displays channel identifiers 106a on the display device 104. Next, at step 315, the user interface 109 of the client terminal 100 receives a first input 110a to select one of the channel identifiers 106a. Continuing at step 320, the terminal controller 115 responsive to the OSD control program 113 displays a pop-up 116 for the selected channel identifier 106a on the display device 104 that includes first program data 107a.

At step 325, if the client terminal 100 receives a second input 110b (e.g. selection of a next or previous icon), then the terminal controller 115 responsive to the OSD control program 113, at step 330, displays a pop-up 116 for the selected channel identifier 106a on the display device 104 that includes second program data 107b for another program occurring at a different time. Otherwise, at step 335, the terminal controller 115 responsive to the OSD control program 113 determines whether the user has selected another channel identifier via user input 110. If so, the terminal controller 115 responsive to the OSD control program 113, at step 320, displays a pop-up 116 for the selected channel identifier 106a on the display device 104 that includes first program data for the other channel. If not, assuming the user has selected the current channel identifier 106a for viewing, at step 340, the client terminal 100 displays the program being aired on the selected channel. Otherwise, the client terminal 100 may perform other processing.

While the present invention and its various functional components have been described in particular embodiments, it should be appreciated the present invention can be implemented in hardware, software, firmware, middleware or a combination thereof and utilized in systems, subsystems, components, or sub-components thereof. When implemented in software, the elements of the present invention are the instructions/code segments to perform the necessary tasks. The program or code segments can be stored in a machine readable medium, such as a processor readable medium or a computer program product, or transmitted by a computer data signal embodied in a carrier wave, or a signal modulated by a carrier, over a transmission medium or communication link. The machine-readable medium or processor-readable medium may include any medium that can store or transfer information in a form readable and executable by a machine (e.g. a terminal controller, a processor, a computer, etc.). Examples of the machine/processor-readable medium include an electronic circuit, a semiconductor memory device, a ROM, a flash memory, an erasable programmable ROM (EPROM), a floppy diskette, CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

We claim:

1. A client terminal connectable to a head end and a display device, the head end provides program guide information including first program data associated with a first program and second program data associated with a second program, the client terminal comprising:
    a channel input interface to receive the program guide information;
    a user interface to receive a first input and a second input; and
    a terminal controller responsive to an on screen display (OSD) control program for:
        a. displaying an arrangement of a plurality of different channel icons associated with respective video program providers in a plurality of rows and columns simultaneously on the display device, the different channel icons representing at least one of broadcast channels and satellite channels;
        b. selecting one of the plurality of different channel icons in response to the first input; and
        c. displaying a pop-up for the selected channel icon on the display device while still displaying the arrangement of the plurality of different channel icons, the pop-up overlaying at least one other channel icon;
    d. wherein:
        i. the pop-up displays the first program data associated with the first program of the selected channel icon in response to the first input and the user interface receives the second input while the pop-up is displaying the first program data; and
        ii. the pop-up displays the second program data associated with the second program of the selected channel icon in response to the second input selecting a selectable button within the pop-up while the arrangement of the plurality of different channel icons in the plurality of rows and columns is still displayed and the pop-up continues to overlay the at least one other channel icon.

2. The client terminal of claim 1, wherein, the selectable button is a next icon, such that the second input selects the next icon resulting in the display of second program data that is associated with a second program that occurs after the first program.

3. The client terminal of claim 1, wherein, the selectable button is a previous icon, such that the second input selects the previous icon resulting in the display of second program data that is associated with a second program that occurs before the first program.

4. The client terminal of claim 1, wherein, the pop-up includes a record icon, such that the second input selects the record icon resulting in the recording of the first program in a local memory.

5. The client terminal of claim 1, wherein, the program guide information displayed in the pop-up includes at least one of a channel number, a channel identifier, a program time, and a title of the program.

6. The client terminal of claim 5, wherein, the program guide information displayed in the pop-up further includes a description of the program.

7. The client terminal of claim 1, wherein, the client terminal displays predetermined channel icons in a predetermined order set by the user.

8. A computer program embodied in a computer readable storage medium for use in a client terminal connectable to a head end and a display device, the head end provides program guide information including first program data associated with a first program and second program data associated with a second program, the client terminal receiving a first input and a second input, the computer program comprising code segments for:
    a. displaying an arrangement of a plurality of different channel icons associated with respective video program providers in a plurality of rows and columns simultaneously on the display device, the different channel icons representing at least one of broadcast channels and satellite channels;
    b. selecting one of the plurality of different channel icons in response to the first input;
    c. displaying a pop-up for the selected channel icon on the display device while still displaying the arrangement of the plurality of different channel icons, the pop-up overlaying at least one other channel icon;
    d. wherein:
        i. the pop-up displays the first program data associated with the first program of the selected channel icon in response to the first input and the client terminal receives the second input while the pop-up is displaying the first program data; and ii. the pop-up displays the second program data associated with the second program of the selected channel icon in response to the second input selecting a selectable button within the pop-up while the arrangement of the plurality of different channel icons in the plurality of rows and columns is still displayed and the pop-up continues to overlay the at least one other channel icon.

9. The computer program of claim 8, further comprising, code segments for displaying the pop-up wherein the selectable button is a next icon, such that the second input selecting the next icon results in the display of second program data that is associated with a second program that occurs after the first program.

10. The computer program of claim 8, further comprising, code segments for displaying the pop-up wherein the selectable button is a previous icon, such that the second input selecting the previous icon results in the display of a second program data that is associated with the second program that occurs before the first program.

11. The computer program of claim 8, further comprising, code segments for displaying the pop-up wherein the pop-up includes a record icon, such that the second input selecting the record icon results in the recording of the first program in a local memory.

12. The computer program of claim 8, further comprising, code segments for displaying the program guide information wherein the program guide information displayed in the pop-up includes at least one of a channel number, a channel identifier, a program time, and a title of the program.

13. The computer program of claim 12, further comprising, code segments for displaying the program guide information wherein the program guide information displayed in the pop-up includes a description of the program.

14. The computer program of claim 8, further comprising, code segments for displaying predetermined channel icons in a predetermined order set by the user.

15. A method of displaying program guide information on a display device, the method comprising the steps of:
   a. displaying an arrangement of a plurality of different channel icons associated with respective video program providers in a plurality of rows and columns simultaneously on the display device, the different channel icons representing at least one of broadcast channels and satellite channels;
   b. receiving a first input to select one of the plurality of different channel icons;
   c. providing program guide information associated with the selected channel icon, the program guide information including first program data associated with a first program and second program data associated with a second program;
   d. displaying a pop-up for the selected channel icon on the display device while still displaying the arrangement of the plurality of different channel icons, the pop-up overlaying at least one other channel icon, the pop-up displaying the first program data associated with the first program of the selected channel icon in response to the first input; and
   e. receiving a second input while the pop-up is displaying the first program data, the pop-up displaying the second program data associated with the second program of the selected channel icon in response to the second input selecting a selectable button within the pop-up while the arrangement of the plurality of different channel icons in the plurality of rows and columns is still displayed and the pop-up continues to overlay the at least one other channel icon.

16. The method of claim 15, wherein, the selectable button is a next icon, such that the second input selecting the next icon results in the display of second program data that is associated with a second program that occurs after the first program.

17. The method of claim 15, wherein, the selectable button is a previous icon, such that the second input selecting the previous icon results in the display of second program data that is associated with a second program that occurs before the first program.

18. The method of claim 15, wherein, the pop-up includes a record icon, such that the second input selecting the record icon results in the recording of the first program in a local memory.

19. The method of claim 15, wherein, the program guide information displayed in the pop-up includes at least one of a channel number, a channel identifier, a program time, and a title of the program.

20. The method of claim 19, wherein, the program guide information displayed in the pop-up includes a description of the program.

21. The method of claim 15, further comprising, the step of displaying predetermined channel icons in a predetermined order set by the user.

* * * * *